No. 767,212. PATENTED AUG. 9, 1904.
G. DORNAUF.
BEARING FOR WHEELS, PULLEYS, OR THE LIKE.
APPLICATION FILED MAR. 25, 1904.
NO MODEL.

Witnesses

Inventor
Georg Dornauf
by Foster, Freeman & Watson
Attorneys

No. 767,212. Patented August 9, 1904.

UNITED STATES PATENT OFFICE.

GEORG DORNAUF, OF KÖNIGSTEIN, GERMANY, ASSIGNOR TO FARBLEDER-WERKE S. MARX & SÖHNE, OF FRANKFORT-ON-THE-MAIN, GERMANY.

BEARING FOR WHEELS, PULLEYS, OR THE LIKE.

SPECIFICATION forming part of Letters Patent No. 767,212, dated August 9, 1904.

Application filed March 25, 1904. Serial No. 199,952. (No model.)

*To all whom it may concern:*

Be it known that I, GEORG DORNAUF, a subject of the German Emperor, residing and having my post-office address at Königstein, Germany, have invented certain new and useful Improvements in Bearings for Wheels, Pulleys, or the Like, of which the following is a specification.

This invention relates to improvements in bearings for wheels, pulleys, or the like the axes of which are inclined with regard to the horizontal; and its object is to provide a bearing therefor without end thrust better capable of retaining lubricating-oil and of distributing such oil longitudinally of the bearing and closed, so as to exclude dirt.

The annexed drawings illustrate as an example the use of the bearing in connection with inclined rear wheels of a trolley.

Figure 1:
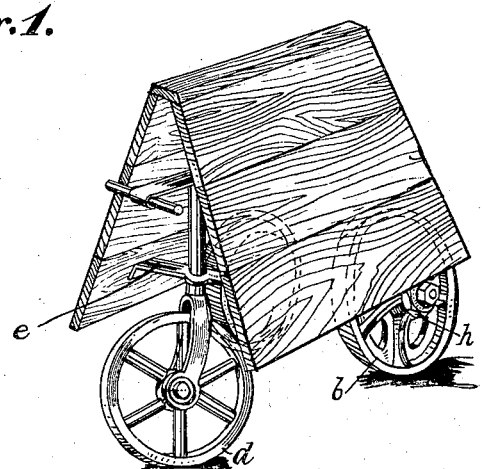
Figure 2:
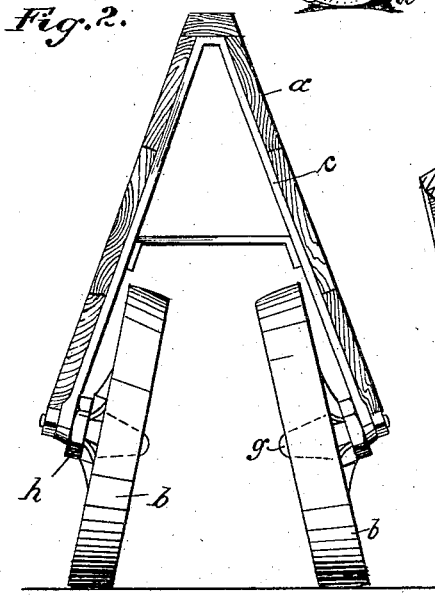
Figure 3:
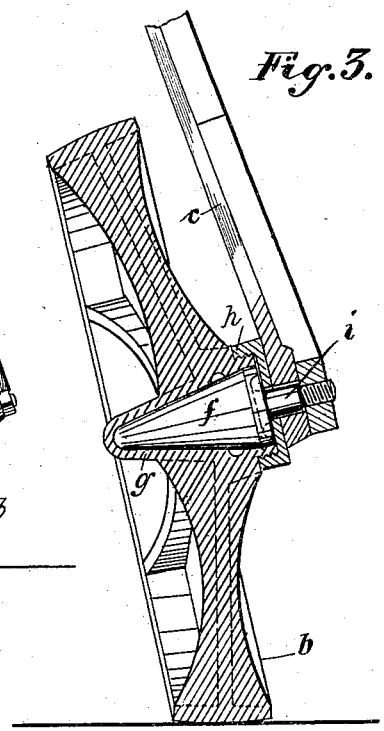

Figure 1 is a perspective view of the trolley; Fig. 2, a cross-section thereof on a larger scale; and Fig. 3, a section of one of the wheels, on a yet larger scale, showing the connection of the axle to the frame.

The two carrying-surfaces of the trolley *a* are fixed to the roof-shaped frame *c*, which supports the rear wheels *b*, and to the frame *e*, in which the fork carrying the guide-wheel *d* is mounted.

The diameter of the rear wheels *b* is preferably as large as practicable in order to facilitate traveling on rough ground. Wheels of large diameter can easily be used for the trolley, since they are arranged between and under the bearing-surfaces of the latter, and therefore do not occupy useful space, as is the case with the vehicles with large wheels hitherto used. Considerations of space have hitherto prevented the use of large wheels for trolleys, and it was preferred to put up with the inconvenience of traveling on uneven ground with small wheels.

The two rear wheels *b* are mounted on the two conical journals *f*, fixed to the frame *c*. Both the latter are fixed on the frame *c* with their axes inclined at desired angles to the horizontal; but the generating-line at their undermost surfaces—that is to say, the bearing-surfaces of the journals—lies in a horizontal plane, so that easy rotation of the rear wheels *b* can take place.

The rear wheels *b* are connected with the conical gudgeons *f* in the following manner: The nave *g* is in the shape of a conical box closed at one end and is drawn onto the cone and held fast thereon by means of a screw-cap or cover *h*, which abuts against the end surface of the cone which faces the frame *c*. By means of the cap *h* a perfectly tight closing of the wheel-nave *g* is obtained, so as to prevent the flowing out of the oil and the entrance of impurities. The cone *f* has a reduced neck *i*, by means of which it is secured in the frame *c*. The cap *h* has a central hole for passage of the neck *i*.

The construction of the bearing allows of arranging the carrying-surfaces *a* of the trolley at the same angles as the wheels *b*—that is to say, inclined, like the sides of a roof—and of placing the wheels *b* between the said carrying-surfaces *a*, so that the space occupied by the trolley is restricted to a minimum, and other advantages are obtained. The arrangement of the rear wheels *b* between the two carrying-surfaces *a* of the trolley produces another advantage besides that of compactness of build—namely, that it is unnecessary to use precautions to prevent the contact of the wheels with corners, door-posts, passage-walls, and the like as was the case with the trolleys, trucks, and the like hitherto used with wheels projecting beyond the sides of the vehicle. With the improved arrangement the wheels can of course pass without difficulty through any opening through which the goods on the trolley can pass. Dryness and heating of the wheels and naves is by this means avoided, since the oil forced upward by the revolution of the wheel always flows back along the inclined surface of the cone to the lower friction-surface. The heating of the wheels *b* is also prevented by the fact that impurities cannot enter the nave *g*.

Owing to the fact that the wheels *b* are arranged between the carrying-surfaces *a* of the trolley and that said surfaces *a* extend downward to the necks *i*, which connect the gudgeons *f* to the frame *c*, the running-gear is entirely protected against external influences, against such as, for instance, water running down the two surfaces $a$. This arrangement is of special advantage if the trolleys are used for conveying skins which are still in process of being tanned. It is known that the water dripping from such skins is very strongly acidulated and contains acids which strongly attack metals, so that the metallic parts of the trolleys are soon destroyed if not protected from said water.

The close arrangement of the guide-wheel $d$ allows of turning the trolley in a small radius without unnecessary friction and sliding and without requiring more space than the length of the carriage.

I claim—

1. An improved bearing for inclined wheels, pulleys and the like comprising in combination with a conical nave-bearing surface closed at the apex, a conical gudgeon or journal serving as shaft or axle and having its axis inclined to the horizontal but its generating-line at its undermost surface, which serves as bearing or supporting surface lying in a horizontal plane, and an annular cap upon the larger end inclosing the shoulder of the gudgeon.

2. In a truck, trolley or other vehicle, the combination of roof-shaped carrying-surfaces $a$ and frame, of inclined wheels between the said carrying-surfaces $a$, having conical nave-bearings, and conical gudgeons on said frame, inwardly directed, tangent at their lower generating-lines to a horizontal plane carrying said wheels.

In testimony whereof I have signed my name to this specification in the presence of two subscribing witnesses.

GEORG DORNAUF.

Witnesses:
F. HASSLACHER,
ERWIN DIPPEL.